(12) United States Patent
Wegmann et al.

(10) Patent No.: US 9,130,834 B2
(45) Date of Patent: Sep. 8, 2015

(54) METHOD AND DEVICE FOR MONITORING BACKBONE INTER BASE-STATION COMMUNICATION

(75) Inventors: Bernhard Wegmann, Holzkirchen (DE); Wolfgang Zirwas, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 360 days.

(21) Appl. No.: 13/518,003

(22) PCT Filed: Dec. 22, 2009

(86) PCT No.: PCT/EP2009/067790
§ 371 (c)(1),
(2), (4) Date: Aug. 14, 2012

(87) PCT Pub. No.: WO2011/076266
PCT Pub. Date: Jun. 30, 2011

(65) Prior Publication Data
US 2012/0329401 A1    Dec. 27, 2012

(51) Int. Cl.
| | |
|---|---|
| H04B 17/00 | (2015.01) |
| H04L 12/24 | (2006.01) |
| H04L 12/26 | (2006.01) |
| H04W 24/06 | (2009.01) |
| H04B 1/38 | (2015.01) |
| H04M 1/00 | (2006.01) |
| H04W 92/20 | (2009.01) |

(52) U.S. Cl.
CPC ............ *H04L 41/0803* (2013.01); *H04L 43/08* (2013.01); *H04L 43/10* (2013.01); *H04W 24/06* (2013.01); *H04L 43/0811* (2013.01); *H04L 43/0852* (2013.01); *H04L 43/0882* (2013.01); *H04L 43/0894* (2013.01); *H04W 92/20* (2013.01)

(58) Field of Classification Search
CPC .... H04B 17/005; H04W 24/00; H04W 24/10; H04W 36/14
USPC ...................... 455/67.11, 560, 561
See application file for complete search history.

(56) References Cited

U.S. PATENT DOCUMENTS

| | | | |
|---|---|---|---|
| 2002/0141360 A1* | 10/2002 | Baba et al. | 370/331 |
| 2005/0213579 A1* | 9/2005 | Iyer et al. | 370/395.2 |
| 2007/0101272 A1* | 5/2007 | Nomura et al. | 715/734 |
| 2008/0075007 A1* | 3/2008 | Mehta et al. | 370/238 |
| 2008/0080388 A1* | 4/2008 | Dean et al. | 370/252 |
| 2008/0144562 A1* | 6/2008 | Draper et al. | 370/315 |
| 2009/0080333 A1* | 3/2009 | Ozer et al. | 370/237 |
| 2009/0201810 A1* | 8/2009 | Kazmi et al. | 370/232 |
| 2009/0201884 A1* | 8/2009 | Chaponniere | 370/332 |

OTHER PUBLICATIONS

R1-083050, 3GPP TSG RAN WGI#54, Jeju, Korea, Aug. 18-22, 2008, "Inter-eNB Schemes for CoMP in LTE-Advanced", Huawei, 2 pgs.
Cauvin, A., "Next Generation Mobile Networks Optimised Backhaul Requirements", NGMN Alliance, Aug. 14, 2008, 29 pgs.
3GPP TS 36.300 V9.1.0 (Sep. 2009), 3$^{rd}$ Generation Partnership Project; Technical specification Group Radio Access Network; Evolved Universal Terrestrial Radio Access (E-UTRA) and Evolved Universal Terrestrial Radio Access Network (E-UTRAN); Overall description; Stage 2 (Release 9), 165 pgs.

* cited by examiner

*Primary Examiner* — Ayodeji Ayotunde
(74) *Attorney, Agent, or Firm* — Harrington & Smith

(57) ABSTRACT

A method, device, and computer program product for data processing in a coordinated multipoint transmission area formed by a base station in a network are provided, wherein the base station determines a performance of a connection to at least one other base station, and wherein the base station and the at least one other base station are connected via an X2 interface. Based on the determined performance, a selection is made between a decentralized self-organizing cooperation and a centralized coordinated multipoint transmission. Furthermore, a communication system is suggested comprising such a device.

10 Claims, 3 Drawing Sheets

METHOD AND DEVICE FOR MONITORING BACKBONE INTER BASE-STATION COMMUNICATION

RELATED APPLICATIONS

This application claims priority to PCT Application No. PCT/EP2009/067790, titled "METHOD AND DEVICE FOR MONITORING BACKBONE INTER BASE-STATION COMMUNICATION", filed on Dec. 22, 2009, which is hereby incorporated by reference in its entirety.

TECHNICAL FIELD

The invention relates to a method and to a device for data processing in a network. Further, a communication system is suggested comprising at least one such device.

For LTE Advanced (LTE-A), a so-called coordinated multi point (CoMP) transmission is a study item with the goal to overcome inter cell interference limitations. High performance gains can be expected from joint precoding solutions, where precoded data are simultaneously transmitted from several base stations (eNBs) to several mobile terminals (UEs).

CoMP transmission refers to a coherent multi-cell transmission with several data streams being jointly transmitted over the same radio resources. Since channel state information of all such jointly used links is known and exploited by means of precoding, each link can be decoded in an interference-free manner. Determining the cooperation area and/or choosing a base station (e.g., eNB) that has (or is provided with) functionalities of a central unit (CU) is regarded as an issue of a self-organizing network (SON).

SUMMARY

An X2 interface (see 3GPP TS36.300 V9.1.0) was introduced to realize logical connections between base stations in a meshed manner. Currently, the X2 interface is basically used to exchange signaling information across several cells, e.g., handover or SON messaging.

Utilizing CoMP transmission, also user data has to be transmitted over the X2 interface. Therefore, the X2 transmission capability becomes of significant importance.

However, it is a disadvantage that using existing X2 interfaces for conveying CoMP transmission traffic may experience a significant delay and therefore CoMP transmission may not provide the expected benefit.

The problem to be solved is to overcome the disadvantage stated above and in particular to provide an efficient utilization of the X2 interface for CoMP transmission purposes.

This problem is solved according to the features of the independent claims. Further embodiments result from the depending claims.

In order to overcome this problem, a method for processing data in a network is provided, wherein a base station determines a performance of a connection to at least one other base station.

Said network may comprise a wireless network, e.g. 2G, 2.5G, 3G, LTE, LTE-A or any other (upcoming) network.

The connection between the base stations also comprises an interface towards another base station. In other words, instead of the performance of the connection between the base stations, it could be referred to a performance of the interface between two base stations. Each base station may be connected to several other base stations. Each such connection may be evaluated regarding its performance. The type of interface between two base stations may be an X2 interface.

This approach efficiently determines the actual performance of the connection between base stations; based on such performance, the decision can be made whether to initialize centralized or decentralized CoMP transmission or to conduct no CoMP transmission at all. In addition, when the decision is made to enable centralized CoMP transmission, based on the performance obtained, a central network component can determine which base station is a suitable candidate to become a central unit (CU) of a CoMP area. In particular, a SON algorithm may determine the best candidate for a CU among the base stations, e.g., of a CoMP area.

In an embodiment, the performance is determined based on at least one of the following:
 a connectivity;
 a delay;
 a transmission capacity, in particular a data rate;
 a cost per data unit;
 a link usage;
 a configuration of a backbone network.

Advantageously, all parameters that may have an impact on the connection could be determined. It is noted that current, minimum, maximum, average values and variances could be determined, in particular measured or monitored (e.g., measured on a more or less regular basis).

In another embodiment, the performance of the connection between the base stations is determined by at least one measurement.

In a further embodiment, said at least one measurement comprises at least one of the following:
 a ping measurement;
 conveying an increasing amount of traffic via the connection between the base stations until an error occurs.

Said error may be a delay exceeding a predefined threshold or it may be an explicit error. This error indicates an upper threshold of the data rate to be conveyed (in addition to already existing user traffic) over this particular connection.

The measurements may be triggered and/or coordinated by a centralized network component (e.g., a SON entity). This advantageously avoids any misinterpretation of the measurements.

In a next embodiment, the base station and the at least one other base station are connected via an X2 interface.

It is also an embodiment that based on the performance, a decentralized or a centralized coordinated multipoint transmission is activated.

It is noted that the performance of the X2 interface may be used (e.g., by a centralized network component, in particular a SON entity) to determine whether decentralized self-organizing cooperation (DCO) should be preferred over centralized CoMP. This will be the case if the performance of the X2 interface(s) within a potential CoMP area does not suffice. In this case, centralized CoMP is not feasible and the more complex DCO approach may have to be pursued.

However, advantageously, based on the measurement of the performance of the interface between the base stations it is possible (e.g. for a centralized network component) to decide whether or not centralized CoMP transmission is feasible. This efficiently avoids starting CoMP processing without any chance to achieve the expected benefit.

Pursuant to another embodiment, performances of connections between base stations of a coordinated multipoint area are determined.

According to an embodiment, the performance is conveyed to a centralized network component.

According to another embodiment, the centralized network component selects a base station to become a central unit of a coordinated multipoint area.

This is in particular done in case the centralized CoMP approach appears to be feasible due to the performance of the interfaces between the base stations. For this purpose, a predefined threshold could be provided that must not be reached; otherwise, decentralized CoMP transmission may be performed (DCO) or no CoMP transmission may be performed at all. In addition, the measurements may indicate the best location of the central unit of the cooperation area.

In yet another embodiment, the centralized network component conveys a message to at least one base station, wherein said message comprises at least one of the following functions:
- the message initiates the base station to determine the performance of at least one connection to at least one other base station;
- the message requests performance results that have been determined;
- the message informs the base station about parameters or performance limitations.

The parameters may comprise cost per data unit. Furthermore, performance limitations may be directed to using inband backbone relaying for user data traffic transfer or proposing enhancements for certain X2 links, which have been determined to be bottlenecks.

According to a next embodiment, the performance of the connection between base stations is determined repeatedly, in particular iteratively or on a substantially regular basis.

The performance may have to be updated in order to become aware of fluctuations, e.g., due to network growth, etc.

The problem stated above is also solved by a device for data processing in a network, comprising or being associated with a processing unit that is arranged to execute the following step: a performance of a connection between at least two base stations of the network is determined.

It is noted that the steps of the method stated herein may be executable on this processing unit as well.

According to an embodiment, the device is associated with at least one centralized network component or at least one base station.

The centralized network component may be a radio resource manager according to LTE.

Pursuant to yet an embodiment, the base stations are connected via an X2 interface.

In particular, a set of base stations can be grouped as a CoMP area (also referred to as cooperation area). For CoMP transmission purposes, coordinated multipoint transmission (precoding) is conducted for the set of base stations grouped together in the CoMP area.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

DETAILED DESCRIPTION OF THE DRAWINGS

Figure 1:
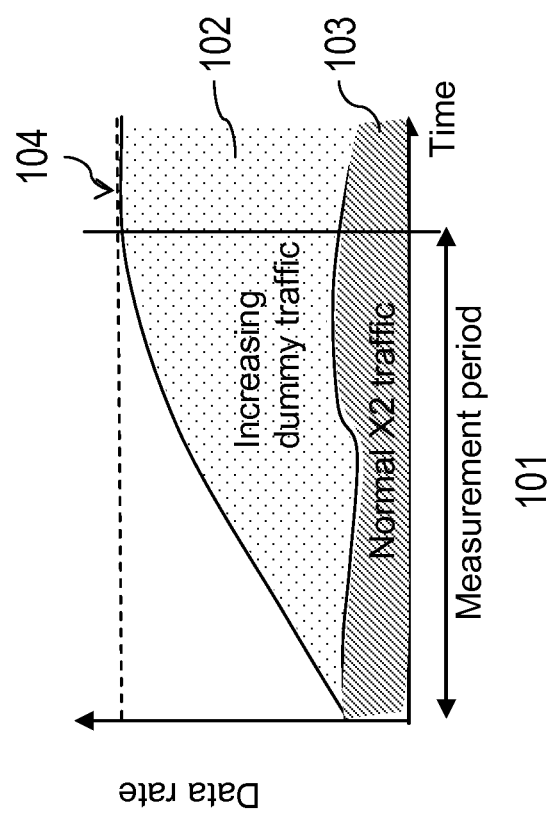
FIG. 1 shows a schematic diagram with a data rate denoted in view of a time axis that is used to visualize a measurement of the performance of an X2 interface.

A CoMP area may comprise several eNBs, wherein one eNB could be selected as a central unit to control procedures of this CoMP area. In order for the SON to determine a suitable candidate for the CU of a CoMP area, information regarding characteristics (e.g., connectivity, capability) of the X2 interfaces between the eNBs of the CoMP area is required.

Such Information regarding the characteristics of the X2 interface may, e.g., comprise:
- a delay of each X2 interface;
- a maximum transmission capacity (data rate) across each X2 interface;
- cost per megabyte (for each X2 interface);
- a statistic of the link usage (first and second order moments) for each X2 interface.

The delay is a critical issue, because channel state information (CSI) and pre-coded user data must not become outdated, otherwise CoMP transmission would not be able to provide the expected benefit.

Accordingly, the SON entity may choose those eNBs with links of low delay, e.g., in the range of few milliseconds only in order to enable an efficient and powerful precoding. Also, different eNBs may assume the CU role depending on CoMP set configurations. Hence, an eNB may be selected as CU that provides the fastest X2 interface connections to the other eNBs of the CoMP area.

The SON entity may also have to decide to enable decentralized self-organizing cooperation (DCO) instead of the centralized scheme in case the performance of the X2 interface(s) do(es) not suffice. DCO provides the same precoding at each eNB in parallel so that each eNB can (autonomously) calculate its transmission signals. In such case, the user data signals to be jointly transmitted are multi-casted by the backbone via S1 interfaces to the corresponding eNBs of the CoMP area and the CSI of all radio links is multi-casted by the UEs in uplink direction to all eNBs involved. Because of the challenging synchronization regarding precoding, processing and scheduling for all eNBs, it is an objective to limit DCO to those scenarios when central processing is not feasible.

In a similar manner the other criteria may be taken into account by the SON algorithms in order to determine which eNB to select as CU of a CoMP area.

The approach provided suggests determining a performance of at least one X2 interface and based on such performance the SON may decide whether to initiate DCO or central processing, e.g., via a CU of a CoMP area.

Advantageously, said performance may be any X2 interface capability, which may be determined, e.g., based on measurements.

Further, it is suggested that performance data regarding the X2 interface is provisioned, in particular regarding the X2 interface's transmission capability. Measurements may be utilized, e.g., to update this performance data.

The required attributes determining the X2 transmission capability can be either configured when setting up the transport bearer of the corresponding X2 interface and remain fixed or they may be updated by measurements, e.g., on a regular basis. For instance, ping measurements may be used to determine a delay over the X2 interface.

X2 interfaces may be connected via a layer 3 VPN (virtual private network) service over a broadband metro network with several routers in between. Changes of the MAN or WAN may affect the delay and the performance of the X2 interface may thus have to be (dynamically) updated. In addition, traffic load of eNBs connected may also have an impact on the time delay of the X2 interface.

A maximum data rate can be determined by transmitting dummy data with an increasing data rate for a short predefined measurement time and in a predefined manner (e.g. increasing with a constant rate until an overflow is detected). Such measurements can be done in a coordinated way to avoid simultaneous measurements of different cells that might influence each other. Therefore, the measurements can be triggered by SON messages for each cell. This may ensure that measurements do not occur during high or full load situations; instead, the measurements can be conducted during low traffic time, e.g., at night, with only a minor impact on the overall system performance.

Hence, this solution also relates to measurement procedures for evaluating CoMP transmission relevant X2 link performance parameters between a set of eNBs. These measurements can be conducted for already established GTP tunnels as being used for user data traffic transfer between cooperating eNBs.

It is noted that worst case delays as defined for the X2 interface delay (20 ms) or peak user data rates for a given link (e.g., 1 Gbit/s for gigabit Ethernet) are not sufficient for the purpose of this approach. Instead, the actual data rate achievable over the physical link established is required including the link's routers and switches etc.

Measurements may comprise at least one of the following:
a) A delay: a minimum delay, a maximum delay, a mean delay, a variance of the delay, etc. For example, IP ping round trip time (RTT) measurements can be used to determine the delay.
b) A user data traffic capacity: minimum, maximum, mean/ average value, variance, etc. of such user data traffic can be measured (or monitored).
c) A configuration of the backbone network can be determined, e.g., a number of links, a setup of switches and routers, currently used traffic priorities, various modes (e.g., gold, silver, bronze) of switches for guaranteeing certain delay limits up to predetermined data rates etc.

For an optimized or improved utilization of the backhaul network, other parameters, e.g., cost per megabyte, could be of interest. Such parameter could be supplied by the MNO for each link and it may be stored with the eNBs.

If not provided, a default value could be assumed. The parameter cost could be considered in different ways, e.g., directly as cost per bit or indirectly as priority levels or specific cost classes. Such priority levels—provided by the MNO—may reflect other motivations of the MNO as to why a particular link shall be preferred over another link (e.g., due to power consumption issues). Hence, the preferences of the MNO could be reflected accordingly.

In addition to the measurements, SON messages may be required to
1) trigger the above-mentioned measurement procedures;
2) request (already stored) measurement results from at least one eNB;
3) inform higher layers of the network or OAM about performance limitations in certain areas of the network and potential alternatives, e.g., using inband backbone relaying for user data traffic transfer or proposing enhancements for certain X2 links, which have been determined to be serious bottlenecks.

FIG. 1 shows a schematic diagram with a data rate denoted in view of a time axis that is used to visualize a measurement of the performance of an X2 interface.

A normal traffic 103 is conveyed over the X2 interface. During a measurement period 101, dummy traffic 102 can be gradually increased by an eNB in order to determine a threshold 104 indicating the maximum data rate that can be conveyed via the X2 interface for a certain delay limit. Several such measurements may be conducted and a mean value of those several measurements can be determined by the eNB. The eNB may thus become aware of the amount of traffic that could be conveyed via the X2 interface.

Figure 2:
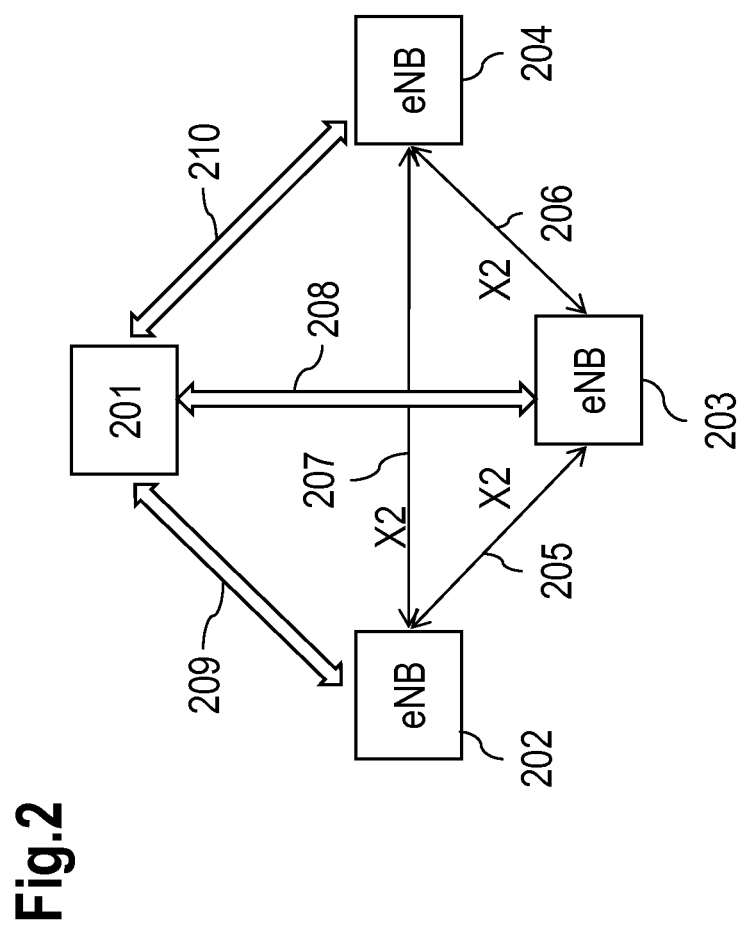
FIG. 2 shows a schematic block diagram comprising a centralized network element and several base stations (eNBs), wherein the eNBs are connected via X2 interfaces.

FIG. 2 shows a schematic block diagram comprising a centralized network element 201 and several base stations (eNBs) 202 to 204, wherein the eNBs are connected via X2 interfaces 205 to 207. The centralized network element 201 is connected to each of the eNBs 202 to 204 via connections 208 to 210. The centralized network element 201 could be a radio resource manager (RRM) of an LTE network.

Figure 3:
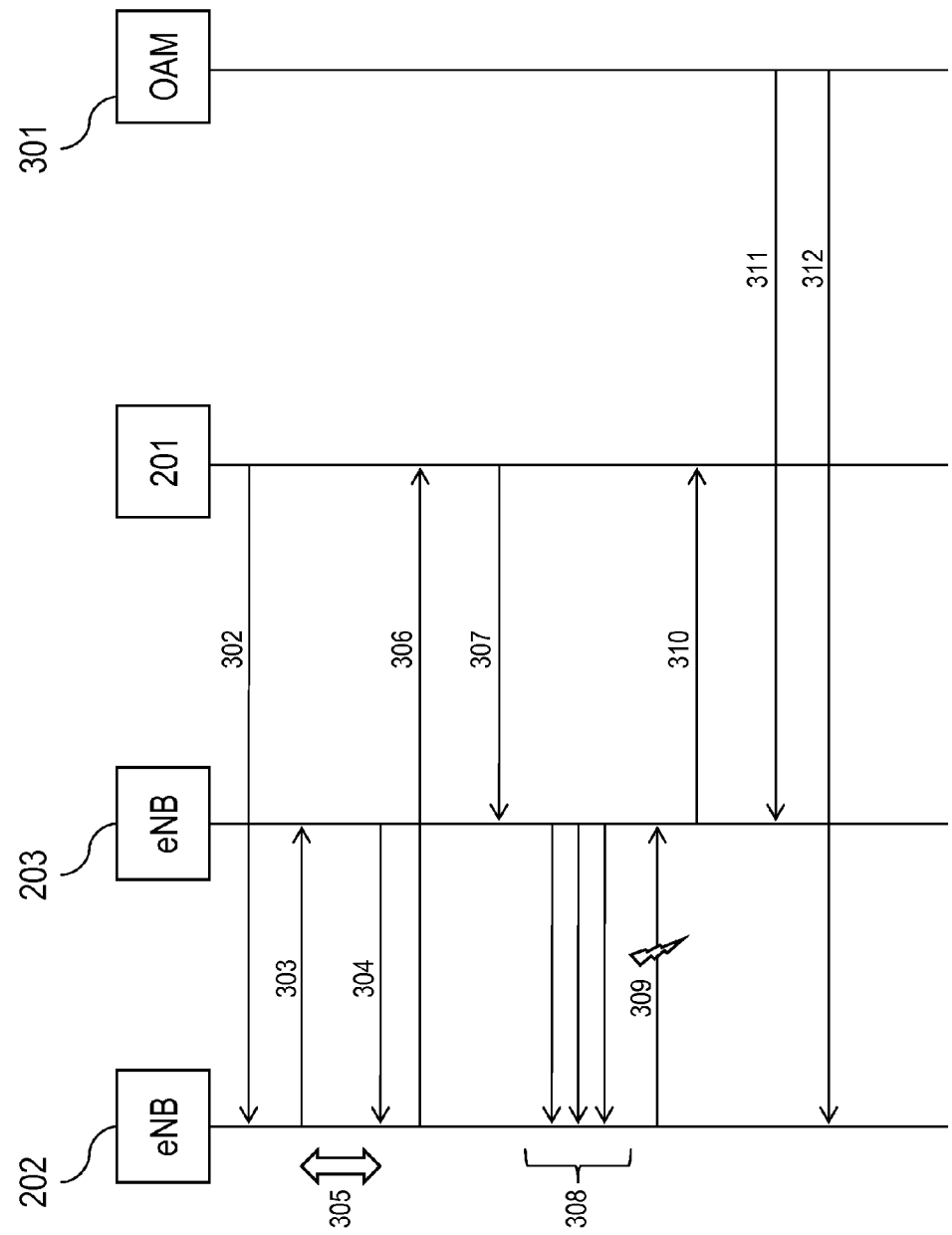
FIG. 3 shows an exemplary message diagram between eNBs and the centralized network element shown in FIG. 2 as well as an OAM unit.

FIG. 3 shows an exemplary message diagram between the eNBs 202, 203 and the centralized network element 201 shown in FIG. 2 and an OAM unit 301.

By conveying a message 302 to the eNB 202, the centralized network element 201 triggers this eNB 202 to conduct measurements regarding its X2 interfaces. The performance of the X2 interface between the eNB 202 and the eNB 203 is determined by sending a (dummy) packet 303 toward the eNB 203 and waiting for an acknowledgment 304. The delay between the messages 303 and 304 can be measured by the eNB 202 and conveyed via a message 306 towards the centralized network element 201. Preferably, several such measurements are conducted (for each X2 interface) to determine an average value of the performance of the X2 interface between the eNB 202 and the eNB 203.

Accordingly, the centralized network element 201 may convey a message 307 towards the eNB 203 requesting to conduct measurements of the performance of its X2 interfaces. The eNB 203 may convey (e.g., increasing) traffic 308 towards the eNB 202 and monitor a delay of feedback provided by said eNB 202. If the delay exceeds a predefined threshold or in case packets are not acknowledged (indicated by arrow 309), the eNB 203 may assume a maximum data rate that could be conveyed across its X2 interface towards the eNB 202. This measurement may be conducted iteratively in order to determine an average value for such maximum data rate or performance of the X2 interface. The result of the measurement(s) could be conveyed via a message 310 to the centralized network element 201.

Furthermore, a message 311 may be conveyed from the OAM unit 301 to the eNB 202 and a message 312 may be conveyed from the OAM unit 301 to the eNB 203, wherein these messages may convey cost per bit supplied by an operator. This cost per bit could be considered by the performance determined for the X2 interfaces and conveyed to the centralized network element 201.

Based on the information provided, the centralized network element 201 may utilize CoMP areas or it may decide whether CoMP is processed in a centralized or in a DCO manner.

It is noted that the block structure shown in FIG. 2 and FIG. 3 could be implemented by a person skilled in the art as various physical units, wherein the eNBs or the centralized network element could be realized as at least one logical entity that may be deployed as program code, e.g., software and/or firmware, running on a processing unit, e.g., a computer, microcontroller, ASIC, FPGA and/or any other logic device.

The functionality described herein may be based on an existing component of a (wireless) network, which is extended by means of software and/or hardware. The eNB mentioned herein could also be referred to as any base station pursuant to any communication standard.

The eNB, the base station or the centralized network element may each comprise at least one physical or logical processing unit that is arranged for determining a performance of a convection or interface between at least two base stations.

LIST OF ABBREVIATIONS

BS Base Station
CoMP Coordinated Multipoint
CSI Channel State Information
CU Central Unit
DCO Decentralized Self Organizing Cooperation
eNB evolved Node B
GPRS General Packet Radio Service
GTP GPRS Tunneling Protocol
ID Identification/Identifier
IP Internet Protocol
JP Joint Processing
LTE Long Term Evolution
LTE-A LTE—Advanced
MAN Metropolitan Area Network
MNO Mobile Network Operator
MS Mobile Station
NB Node B
OAM Operation and Maintenance
RTT Round Trip Time
SON Self Optimizing Network
SON Self Optimizing Network
UE User Equipment
VPN Virtual Private Network
WAN Wide Area Network

What is claimed is:

1. A method comprising:
   in a coordinated multipoint transmission area formed at least by a base station in a network and at least one other base station, determining, by the base station, performance of a connection to the at least one other base station, wherein the base station and the at least one other base station are connected via an X2 interface; and
   based on the determined performance, selecting between a decentralized self-organizing cooperation and a centralized coordinated multipoint transmission, wherein, in response to selecting the decentralized self-organizing cooperation, providing identical precoding in parallel to each base station allowing each base station autonomous transmission signals calculation.

2. The method according to claim 1, wherein the performance is determined based on at least one of the following:
   a connectivity;
   a delay;
   a transmission capacity, in particular a data rate;
   a cost per data unit;
   a link usage;
   a configuration of a backbone network.

3. The method according to claim 1, wherein the performance of the connection between the base stations is determined by at least one measurement.

4. The method according to claim 3, wherein said at least one measurement comprises at least one of the following:
   a ping measurement;
   conveying an increasing amount of traffic via the connection between the base stations until an error occurs.

5. The method according to claim 1, wherein the performance is conveyed to a centralized network component.

6. The method according to claim 5, wherein the centralized network component selects the base station to become a central unit of a coordinated multipoint area.

7. The method according to claim 5,
   wherein the centralized network component conveys a message to the base station, and
   wherein said message comprises at least one of the following functions:
      the message initiates the base station to determine the performance of at least one connection to the at least one other base station;
      the message requests performance results that have been determined;
      the message informs the base station about parameters or performance limitations.

8. The method according to claim 1, wherein the performance of the connection between the base station and the at least one other base station is determined repeatedly, in particular iteratively or on a substantially regular basis.

9. A computer program product embodied on a non-transitory computer-readable medium in which a computer program is stored that, when being executed by a computer, is configured to provide instructions to control or carry out:
   in a coordinated multipoint transmission area formed at least by a base station in a network and at least one other base station, determining performance of a connection to the at least one other base station, wherein the base station and the at least one other base station are connected via an X2 interface; and
   based on the determined performance, selecting between a decentralized self-organizing cooperation and a centralized coordinated multipoint transmission, providing identical precoding in parallel to each base station allowing each base station autonomous transmission signals calculation.

10. An apparatus comprising:
   at least one processor and at least one memory including computer program code, wherein the at least one memory and the computer code are configured, with the at least one processor, to cause the apparatus to at least perform or control the following:
   in a coordinated multipoint transmission area formed at least by a base station in a network and at least one other base station, determining performance of a connection to the at least one other base station, wherein the base station and the at least one other base station are connected via an X2 interface; and
   based on the determined performance, selecting between a decentralized self-organizing cooperation and a centralized coordinated multipoint transmission, providing identical precoding in parallel to each base station allowing each base station autonomous transmission signals calculation.

* * * * *